Sept. 1, 1970      E. J. STROPKAY      3,526,056
ADJUSTABLE LOOP TIE FASTENER
Filed Sept. 29, 1967
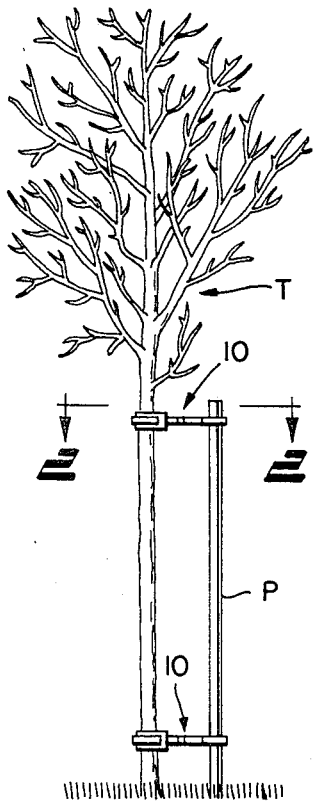
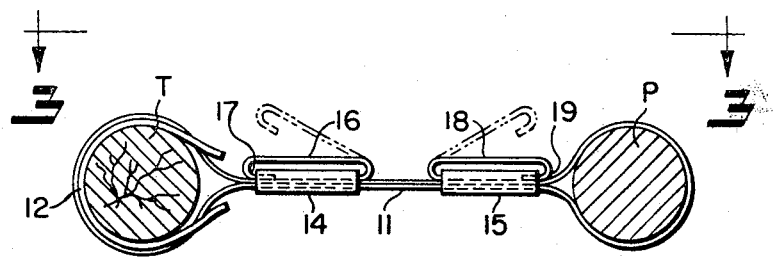
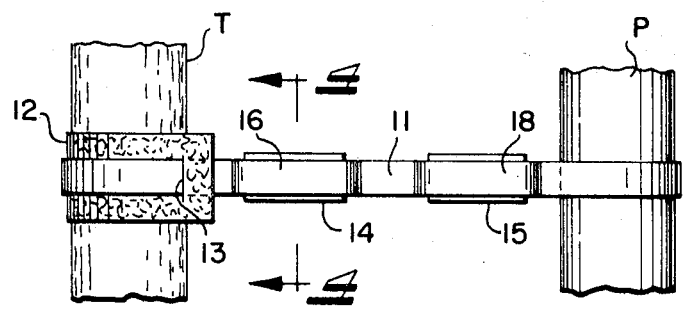
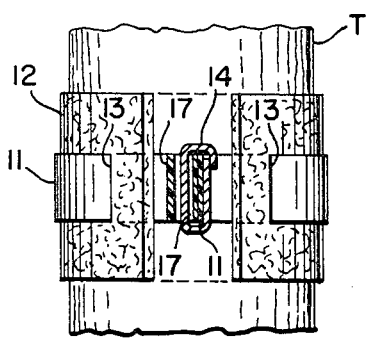
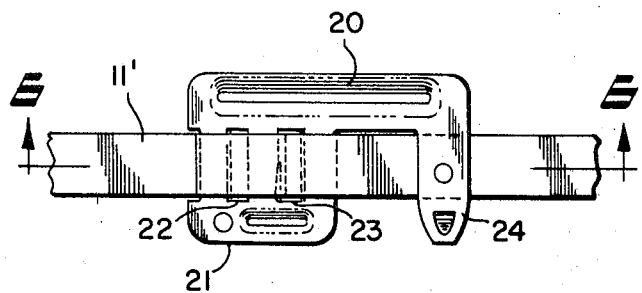
INVENTOR
EDWARD J. STROPKAY
BY
Oberlin, Maky, Donnelly & Renner
ATTORNEYS

United States Patent Office 3,526,056
Patented Sept. 1, 1970

3,526,056
ADJUSTABLE LOOP TIE FASTENER
Edward J. Stropkay, 11348 Spruce Drive,
Chesterland, Ohio 44026
Filed Sept. 29, 1967, Ser. No. 671,833
Int. Cl. A01g *17/12;* A43c *11/00*
U.S. Cl. 47—42                 2 Claims

ABSTRACT OF THE DISCLOSURE

A tree tie and the like comprising a single length of nylon strap having adjustable loops at its respective ends, with the strap ends at such loops secured solely by threading about retainer sleeves or slides. A winding device can be applied to the strap for variable shortening of the same.

---

This invention relates to a fastener of double loop type which is particularly well suited for use as a tree tie, the couple a newly planted tree for example to a lateral support.

It is a primary object of the invention to provide such a tie fastener having two separate adjustable loops at its respective ends to engage the two articles being coupled, such as the tree and a laterally spaced support stake in the principal intended application of the device.

Another object is to provide such a fastener which is inexpensive and easy to apply and yet extremely durable in respect of all normal wear and weathering conditions in exposed places.

It is a further object of the invention to provide such a tree tie which has a neat and professional appearance while being usable without any skill or tools required.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is an elevational view of a tree and support coupled by fasteners in accordance with the present invention;

FIG. 2 is a horizontal cross section of FIG. 1 on the line 2—2 therein and on a relatively enlarged scale;

FIG. 3 is a fragmented side elevation of the FIG. 2 section as shown by the line 3—3 in the latter;

FIG. 4 is a fragmentary transverse section on the plane of the line 4—4 in FIG. 3 and on a still further enlarged scale;

FIG. 5 is a fragmented elevation showing a winding device which can be used with the fastener; and FIG. 6 is a longitudinal section taken on the line 6—6 in FIG. 5.

Referring now to the drawing in detail, the first illustrated arrangement of a support stake or post P driven vertically into the ground alongside the tree T to be propped is the one most commonly used for the purpose. In this case the tree is shown fastened to the post by two of the new tree ties, designated generally by reference numeral 10, with their lengths such to maintain the tree upright, but it will be obviously appreciated that a single such tie may be sufficient in other and probably the majority of such applications.

The new tie fastener 10 comprises a single strap 11 which is preferably made of nylon as used presently for container and article strapping in the packaging art as a substitute for the more conventional steel strapping. This nylon strap retains its form and is self-supporting, but can easily by hand be bent across its width to take a fairly firm but not permanent set. These characteristics are not critically unique to the nylon strap, and other materials including metal and other plastics might be employed.

However, the nylon strapping is preferred as being readily commercially available in a directly usable form, with only cutting to length required, and the durability of this material is such that no deterioration with time and weathering ever over long periods will be encountered.

The tie fastener further comprises a relatively soft pad 12, preferably of foamed polyethylene which is also readily available, to be applied inside the strap against the trunk of the tree. Such pad has slits 13 adjacent its respective ends through which the strap is threaded as shown for association of the two and, if desired, additional slits can be provided for more than the illustrated minimum threading of the strap.

First and second retainer sleeves 14 and 15 complete the tie fastener. These sleeves can be made of metal or plastic and are of flattened form with an inner clearance or separation between the sides which is slightly greater than twice the thickness of the strap. The manner in which the strap is related to the retainer sleeves and forms the desired adjustable loops at each end respectively to engage the tree and the post will be most clearly appreciated from the following description of one manner in which the tie is actually applied or installed.

The strap 10 is initially simply a finite length judged from experience to be sufficient for the given tree and post arrangement, and the protective pad 11 is first placed on the strap by the noted threading and moved along to an intermediate location. One end of the strap is passed through the first retainer sleeve 14 until there is an end portion 16 projecting from the end of this sleeve remote from the pad 11 which is longer than the length of the sleeve, for example, approximately one and one-half times the sleeve length. This portion 16 is bent back over sleeve 14 and the extreme end further rebent as shown at 17 and inserted in the opposite direction in the other end of the sleeve. Such wrapping of the strap secures the first sleeve 14 to the one such end thereof.

The strap 10 can then be placed about the trunk of the tree, with the pad 11 innermost and adjusted on the strap to embrace the trunk, and the other free end of the strap is then threaded back through the first retainer sleeve 14 to form the adjustable tree loop. The free end is pulled to decrease this loop and bring it snugly against the trunk.

The second retainer sleeve 15 is placed on the free length of the strap extending from the tree loop and moved along the same substantially in this application to the first sleeve so it will be out of the way when the strap length is wrapped about the support post as the next step to form the post loop. This post loop is completed by bringing the free end of the strap reversely through the sleeve 15 again to provide an end length projection 18 approximately one and one-half times the length of the sleeve, and this projection is bent back over sleeve 15 and its extreme end 19 inserted in the opposite sleeve end, all as in the fastening of the first sleeve to the strap. Also as in the wrapping of the tree trunk, the post loop will be drawn inwardly against the post snugly to embrace the same before the noted fastening of this end of the strap at the second retainer sleeve.

The described locking of the ends of the strap in the two sleeves or slides has been tested and proved to be quite adequate, so that added mechanical restraints or the like are not required. The strap length will, as earlier noted, be judged approximately from the sizes and spacing of the tree and post, and it will be evident that this new fastener thus offers considerable adjustability to accommodate different sizes of the two sections of the articles to be interconnected and also considerable variation in the separation or lateral spacing of the same. Nevertheless, the device is extremely simple both in its construction and manner of use.

The new fastener can also be used with equal facility to guy the tree, for example, by extending angularly from a ground stake to an elevated part of the trunk, and normally three fasteners would be used in this arrangement with roughly equidistant spacing of the stakes from each other and the tree for multi-directional support as is common.

In this application, the strap length is of course longer than in the lateral tie use illustrated, with the end loops however of the same form and operation. However, in view of the considerable length for such a guy, it might be convenient to utilize a take-up device for the strap, and a metal tensioner 20 is shown associated with an intermediate length of strap 11' in FIGS. 5 and 6 as one such device. Tensioner 20 has a winding plate section 21 in which two parallel slots 22 and 23 are formed for threading of straps 11' in the configuration shown, which will be seen to provide locking of the two. The tensioner can then be rotated to wind or wrap the strap thereon in as many turns desired for the length reduction, and the strap to one side is hooked behind the internal spaced finger 24 to hold the wrapping.

Other modes of applying the principle of the invention may be employed, change being made as regards the details described, provided the features state in any of the following claims or the equivalent of such be employed.

I, therefore, particularly point out and distinctly claim as my invention:

1. A tie fastener for tree support and the like, comprising a flexible strap capable of taking a firm set when bent across its width, an end length of the strap being curved and brought back against an intermediate length of the strap to form a loop for engagement about the tree in application of the fastener, a retainer sleeve slidably enclosing said intermediate length and the end length thereagainst, the terminal part of such end length projecting from the sleeve end away from the loop and being bent reversely exteriorly over the sleeve, with a further reverse bend in the strap at the other sleeve end forming an end tab which is inserted in such other end of the sleeve, the strap end thereby being secured to the sleeve and the latter being slidable on the intermediate length for adjustment of the loop, and means at the other end of the strap for securing the same to a support for the tree in such application of the fastener.

2. A fastener as set forth in claim 1, wherein the last named means is a second retainer sleeve to which the other end length of the strap is secured in the same manner as the first named end length.

References Cited

UNITED STATES PATENTS

| | | | |
|---|---|---|---|
| 1,144,593 | 6/1915 | Heiser | 248—59 |
| 2,134,242 | 10/1938 | Wade | 47—47 |
| 2,241,001 | 5/1941 | Peterson | 47—47 |
| 2,528,376 | 10/1950 | Mackenzie | 24—23 |
| 3,010,256 | 11/1961 | Ise | 47—42 |
| 3,242,542 | 3/1966 | Tako | 24—71.3 |

ROBERT E. BAGWILL, Primary Examiner

U.S. Cl. X.R.

24—71.3, 81; 248—231